United States Patent [19]

Shou et al.

[11] Patent Number: 6,038,250
[45] Date of Patent: Mar. 14, 2000

[54] INITIAL SYNCHRONIZATION METHOD AND RECEIVER FOR DS-CDMA INTER BASE STATION ASYNCHRONOUS CELLULAR SYSTEM

[75] Inventors: Guoliang Shou; Changming Zhou; Xuping Zhou, all of Tokyo, Japan

[73] Assignee: Yozan Inc., Tokyo, Japan

[21] Appl. No.: 09/003,509

[22] Filed: Jan. 6, 1998

[30] Foreign Application Priority Data

Jan. 7, 1997 [JP] Japan .................................. 9-011960

[51] Int. Cl.[7] ............................ H04B 7/216; H04B 1/707
[52] U.S. Cl. ......................... 375/206; 375/207; 370/335; 370/342
[58] Field of Search .................................. 375/200, 206, 375/207, 208, 343, 367; 370/320, 335, 342, 515

[56] References Cited

U.S. PATENT DOCUMENTS

| | | | |
|---|---|---|---|
| 4,969,159 | 11/1990 | Belcher et al. | 375/207 |
| 4,984,247 | 1/1991 | Kaufmann et al. | 375/200 |
| 5,495,509 | 2/1996 | Lundquist et al. | 375/367 |
| 5,673,260 | 9/1997 | Umeda et al. | 370/342 |
| 5,717,713 | 2/1998 | Natali | 375/200 |
| 5,790,588 | 8/1998 | Fukawa et al. | 375/200 |
| 5,892,792 | 4/1999 | Walley | 375/206 |
| 5,910,948 | 6/1999 | Shou et al. | 370/335 |
| 5,914,943 | 6/1999 | Higuchi et al. | 370/320 |
| 5,930,230 | 7/1999 | Odenwalder et al. | 370/208 |
| 5,940,433 | 8/1999 | Sawahashi et al. | 375/206 |

OTHER PUBLICATIONS

Kenichi Higuchi, Mamoru Sawahashi and Fumiyuki Adachi, "Two–Stage Rapid Long Code Acquisition Scheme in DS–CDMA Asynchronous Cellular System", Technical Report if IEICE, CS96–19, RCS96–12 (May 1996), pp. 27–32.

*Primary Examiner*—Young T. Tse
*Attorney, Agent, or Firm*—Pillsbury Madison & Sutro LLP

[57] ABSTRACT

Cells are searched at a high speed using an initial synchronization method and a receiver for a DS-CDMA inter base station asynchronous cellular system. A base band received signal is input to a matched filter and is correlated with a spread code supplied from a spread code generator. A signal electric power calculator calculates the electric power of the correlation output of the matched filter, and outputs the result to a long code synchronization timing determiner, a threshold value calculator, and a long code identifier. During the initial cell search, the spread code generator outputs a short code #0 that is common to the control channel of each of the base stations. After the long code synchronization timing has been determined, each of the segments of the N chips which constitutes a portion of the synthesized spread code sequence synthesized from a long code #i that is unique to each of the base stations and the short code #0 is sequentially replaced and output.

16 Claims, 11 Drawing Sheets

| | A | B | ... | Z |
|---|---|---|---|---|
| SEGMENT OF SYNTHESIZED CODE#1 | PN(1)128 | PN(1)127 | ... | PN(1)1 |
| SEGMENT OF SYNTHESIZED CODE#2 | PN(2)M+128 | PN(2)M+127 | ... | PN(2)M+1 |
| SEGMENT OF SYNTHESIZED CODE#3 | PN(3)2M+128 | PN(3)2M+127 | ... | PN(3)2M+1 |
| ... | | | | |
| SEGMENT OF SYNTHESIZED CODE#512 | PN(512)511M+128 | PN(512)511M+127 | ... | PN(512)511M+1 |

*FIG. 6*

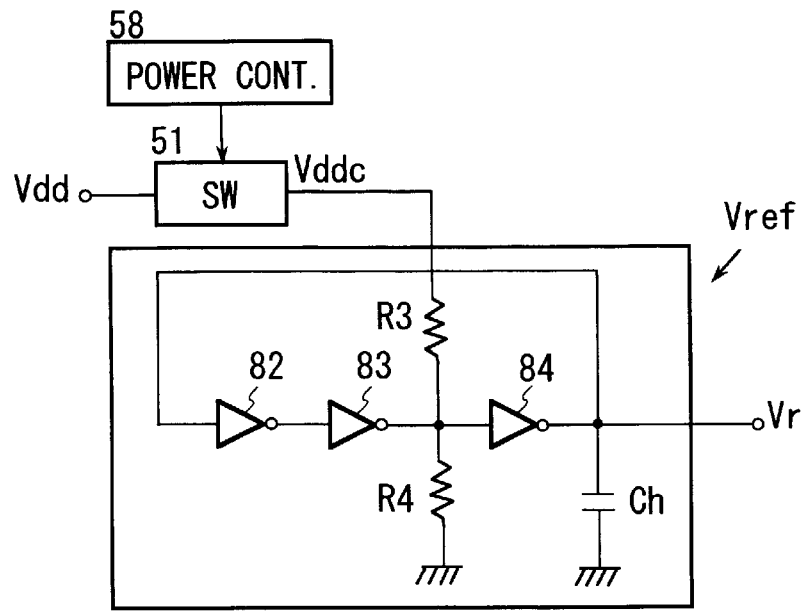
F I G . 1 3
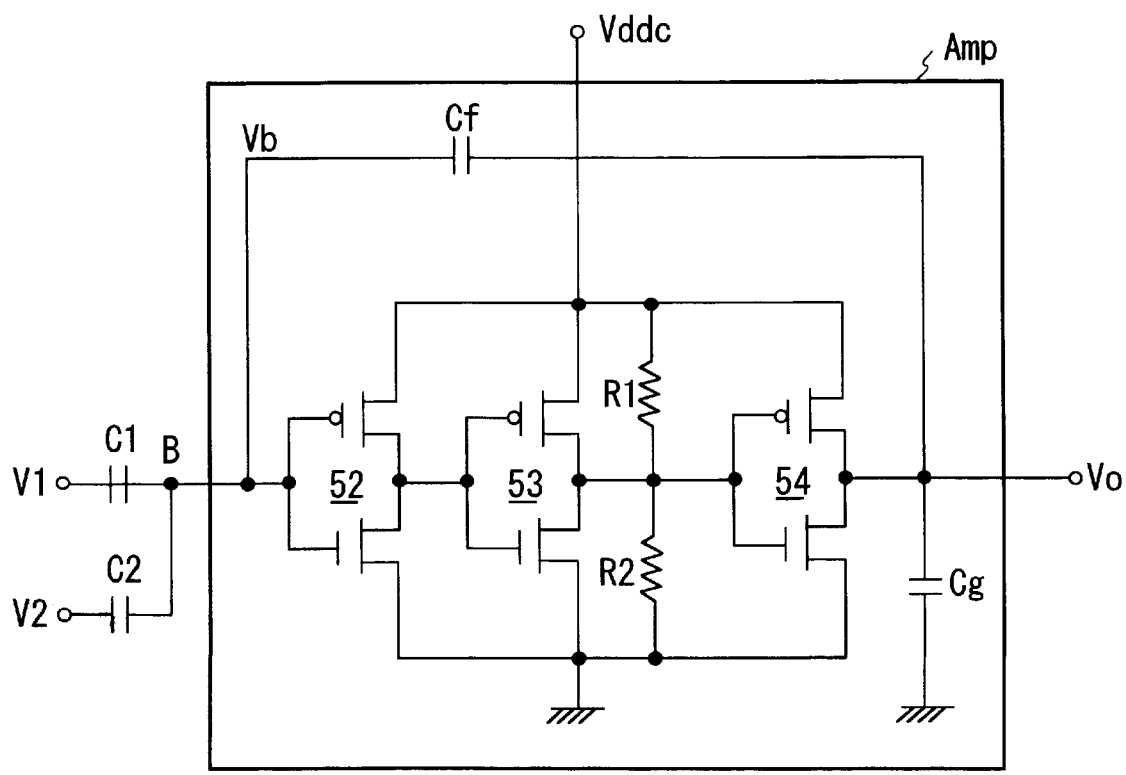
F I G . 1 4

INITIAL SYNCHRONIZATION METHOD AND RECEIVER FOR DS-CDMA INTER BASE STATION ASYNCHRONOUS CELLULAR SYSTEM

This patent application claims a conventional priority based on a Japanese patent application, HEI9-011960 filed on Jan. 7, 1997, the contents of which are incorporated hereinto by reference.

BACKGROUND OF THE INVENTION

1. Field of Invention

The present invention relates to an initial synchronization method and a receiver for initial synchronization in a DS-CDMA (Direct Sequence-Code Division Multiple Access) inter base station asynchronous cellular system.

2. Description of Related Art

CDMA cellular systems based on code division multiple access (CDMA) using a direct sequence (DS)-type spread spectrum (SS) greatly increases the channel capacity. These systems are receiving much attention in the recent work on ground mobile communication. In general, the frequency utilization efficiency of a CDMA system is inferior to that of other multiple access systems (FDMA, TDMA) because of mutual interference with other stations. However, the cellular system is robust against interference since the spatial frequency re-utilization efficiency (repetition rate of cells having the same frequency) contributes to the efficiency of the overall frequency utilization. Hence, a CDMA cellular system having a high cell repetition rate is assured to be an effective system in the future.

Generally, cellular systems require two kinds of cell searches, namely, an initial cell search by which an initial cell to be connected to a mobile station is identified, and a neighboring cell search by which neighboring cells are searched for the hand-over. Notably in DS-CDMA cellular systems, each of the cells uses the same frequency. Hence, the initial synchronization needs to reduce the timing error between the spread code of the received signal and the spread code replica generated by the receiver to within ½ chip period while the simultaneous cell search.

DS-CDMA cellular systems can be categorized into two classes, namely, inter base station synchronous systems in which temporal synchronization is performed strictly among all base stations, and inter base station asynchronous systems in which temporal synchronization is not performed. Inter base station synchronous systems achieve inter base station synchronization using other systems such as the GPS (Global Positioning System). Since each of the base stations uses the same long code by giving it a delay which differs from one base station to another, it suffices to synchronize only the timing of the long code during the initial search. In addition, the neighboring cell search for the hand-over can be performed at a higher speed since the mobile station receives the code delay information of the neighboring base stations directly from the given base station with which the mobile station is at a given time communicating.

On the other hand, in inter base station asynchronous systems, each of the base stations uses a different spread code in order to identify the base stations. The mobile station needs to identify the spread codes in performing the initial cell search. When searching neighboring cells for the hand-over, the number of codes to be searched can be limited by obtaining the spread codes of the neighboring base stations from the current base station to which the mobile station belongs. However, in comparison with inter base station synchronous system, the search time is longer. Indeed when a long code is used for the spread code, the amount of time for the cell search becomes enormous. However, this inter base station asynchronous system has an advantage in that other systems such as GPS are not needed.

A cell search system capable of solving these problems inherent in the inter base station asynchronous systems and performing initial synchronization at a high speed is being proposed by Kenichi Higuchi, Mamoru Sawahashi, and Fumiyuki Adachi, in "Two-step high speed long code initial synchronization method in the DS-CDMA inter base station asynchronous system" (Shingakugihou CS-96-19, RCS96-12 (1996-05)). According to this initial synchronization method, a spread code sequence synthesized from a long code corresponding to the cells and a short code corresponding to a communication channel is used to doubly spread the data. A second short code common to all cells is assigned to the control channel in order to perform the initial synchronization in two steps.

More specifically only the short code is used and the long spread code is masked for the control channel transmitted from the base station of every cell. On the mobile station side, at the first stage, a matched filter de-spreads the received signal by using the short code and detects the timing of the long code. At the second stage, a correlator identifies the long code corresponding to a cell by using a spread code sequence synthesized from the long code corresponding to the cell and the specific short code.

FIG. 1 illustrates a configuration of cells. In FIG. 1, the numeral 61 represents the mobile station. Each of the cells #1 through #n has one of the base stations $BS_1$, $BS_2$, ..., BSn, respectively. Each base station sends a signal to the mobile station 61 by using symbols which are doubly spread by the long codes #1, #2, ..., #n and the short codes #0–#s identifying each channel. Here, the short codes #0–#s are common to each of the cells. In addition, the common short code #0 is assigned to the control channel of each of the cells.

FIG. 2 is a timing chart for explaining the conventional two-step high speed initial synchronization method, and an example of a signal of a control channel received at a mobile station. The control channel received from each of the base stations contains certain symbols, which have been spread only by the short code #0 every long-code period. Signals received from $BS_{k-2}$, $BS_{k-1}$, and $BS_k$ are shown in the drawing and the certain symbols are shown as shaded portions of the signals. This short code #0 is assigned commonly to all of the base stations, and this is achieved by not spreading the signals with the long codes over a certain period. The other symbol positions of the control channels are doubly spread using the long code #i, which differs from one base station to another, and the short code #0. In this way, the control channels transmitted from each of the base stations $BS_{k-2}$–$BS_k$ are asynchronously multiplexed and are received at the mobile station.

In the first stage, the mobile station finds a correlation between the base band received signal and the short code #0 using a matched filter. The peak of the correlation is detected at the temporal position corresponding to the reception timing of the symbol which is spread with the short code #0 of the control channel of the base stations. The timing corresponding to the maximum electric power is detected after these peak electric powers have been detected over the R-period of the long code. The detected timing, the code timing T, is determined to be the long code synchronization timing transmitted from the base station of the new cell in which a mobile station is located.

In the second stage, in order to identify the base station $BS_k$, the mobile station 61 identifies the long code #k that is used to spread the control channel, the long code timing T of which has been detected. In order to accomplish this, the long code #k is sequentially selected out of the long codes #1–#n of the system in the initial cell search. A replica code is synthesized from the selected long code #k and the short code #0, and correlation is detected by a correlator using the long code synchronization timing obtained in the first stage.

The correlation detection is continued over the range of long codes #1–#n until a long code causes the correlation detection value to exceed the threshold value. The long code that has exceeded the threshold value is judged to be the long code #k of the new base station, and the cell search is completed.

When searching the neighboring cell for the hand over, similarly, a replica code is synthesized from the short code #0 and the long code #k. The long code #k is sequentially selected from the long codes of neighboring cells transmitted by the current base station to the mobile station. Correlation is detected using the long code synchronization timing.

As seen in the above, cell search can be performed at a high speed by performing the timing synchronization and the identification of the long code separately. According to the standard inter base station asynchronous cellular systems, correlation detection needs to be performed approximately (the number of spread codes x the number of phases of the spread codes) times to search a cell.

On the other hand, according to this method, it suffices to perform correlation detection (the number of spread codes+ the number of phases of the spread codes) times. Therefore, in comparison with the standard inter base station asynchronous cellular systems, a cell can be searched at a high speed. However, a problem still remains when the correlation detection is performed using a correlator, as is done in the prior art. The length of time required for detecting every correlation still remains long. Hence, it is desired that the initial synchronization be performed at a higher speed.

SUMMARY OF THE INVENTION

Therefore, it is an object of the present invention to provide an initial synchronization method and a receiver for a DS-CDMA inter base station asynchronous cellular system capable of performing cell searches at a higher speed.

In order to achieve the above object, according to the first aspect of the present invention, spread code sequences are made of long codes corresponding to the cells and short codes corresponding to the communication channels. A specific short code common to each of the cells is assigned to the control channel for the initial synchronization of the DS-CDMA inter base station asynchronous cellular system.

Based on the correlation between the specific short code and the received signal, the long code synchronization timing transmitted from the corresponding base station is determined. A synthesized code for each long code is defined by a combination of the long code and the specific short code. The matched filter detects the correlation between the received signal and each of several segments, each segment being taken from a portion of one of the synthesized code. In particular, the segment taken from a next synthesized code is extracted starting from a position in the next synthesized code, which is shifted by a predetermined amount from where the segment of the first synthesized code was extracted. The amount of shifting, however, is smaller than the length of the segments. The long code transmitted from the corresponding base station is identified based on the magnitude of the electric power of the correlation.

The correlation between each of the segments and the received signal is detected based on the long code synchronization timing, by sequentially replacing each of the segments every time, an interval of the received signal corresponding to the prescribed chip number is newly input to the matched filter.

A portion of the base band received signal still remains in the matched filter at the time the correlation with the segment of one synthesized code has been processed. Thus, the portion can be used for processing the correlation with the segment of the next synthesized code instead of being disposed of. Consequently, the long codes can be searched at a higher speed. In contrast, when a sliding correlator is used as in the prior art, the received signal used for the previous correlation is discarded immediately before processing the next correlation.

According to the second aspect of the present invention, the receiver for the DS-CDMA inter base station asynchronous cellular system uses spread code sequences synthesized from long codes corresponding to the cells and short codes corresponding to the communication channels. A specific short code is assigned to the control channel of all cells. The receiver has a spread code generating means for outputting each of several segments, each segment being taken from a portion of one of the synthesized code.

In particular, the segment taken from a next synthesized code is extracted starting from a position in the next synthesized code, which is shifted by a predetermined amount from where the segment of the first synthesized code was extracted. The amount of shifting, however, is smaller than the length of the segments. A matched filter finds a correlation between the output of the corresponding spread code generating means and the received signal. A long code synchronization timing determination means determines the long code synchronization timing transmitted from the corresponding base station using the correlation between the specific short code and the received signal.

The long code identification means supplies one of the segments to the matched filter from the spread code generating means based on the long code synchronization timing. Then the long code identification means sequentially replaces each of the segments and supplies the segment every time an interval of the received signal corresponding to the amount of shifting is newly input to the matched filter, and identifies the long codes transmitted from the corresponding base station based on the magnitude of the electric power of the output signal of the matched filter. Accordingly, long codes can be searched faster.

According to the third aspect of the present invention, the spread code generating means further outputs the specific short code. The long code synchronization timing determination means supplies the specific short code from the spread code generating means to the matched filter, and determines the synchronization timing of the long code transmitted from the corresponding base station based on the electric power of the output signal of the matched filter. Therefore, the long code synchronization timing can be easily determined. The long code synchronization timing and the identification of the long code can be determined using the matched filter.

According to the fourth aspect of the present invention, the matched filter has multiple sample holders and multiple multipliers for outputting signals from the sample holders as the first and second outputs according to the value of the bits corresponding to the output of the spread code generating means. A first analog addition circuit adds the first outputs of the multipliers. A second analog addition circuit adds the second outputs of the multipliers. A third analog addition circuit subtracts the output of the first analog addition circuit from the output of the second analog addition circuit. Since the above-mentioned matched filter consumes a small amount of electric power, the electric power consumption of the receiver can be reduced accordingly.

BRIEF DESCRIPTION OF THE DRAWINGS

FIG. 6 shows a synthesized code to be input to the coefficient input terminal of the matched filter.

FIG. 13 illustrates the reference voltage generator Vref.

FIG. 14 illustrates an analog operation circuit that supplies the input voltage to the inversion amplifier via capacitors.

DETAILED DESCRIPTION OF THE INVENTION

The preferred embodiment of the present invention will be explained with reference to the attached drawings. Each base station periodically masks the long code of one information symbol length every long code cycle which starts at a prescribed time of the control channel, and transmits the symbol that has been spread only by the short code #0 that is common to all base stations. The transmitter of the base station BS transmits a transmission signal obtained by spreading the transmission data with binary spread codes and QPSK-modulating the transmission signal.

Figure 1:
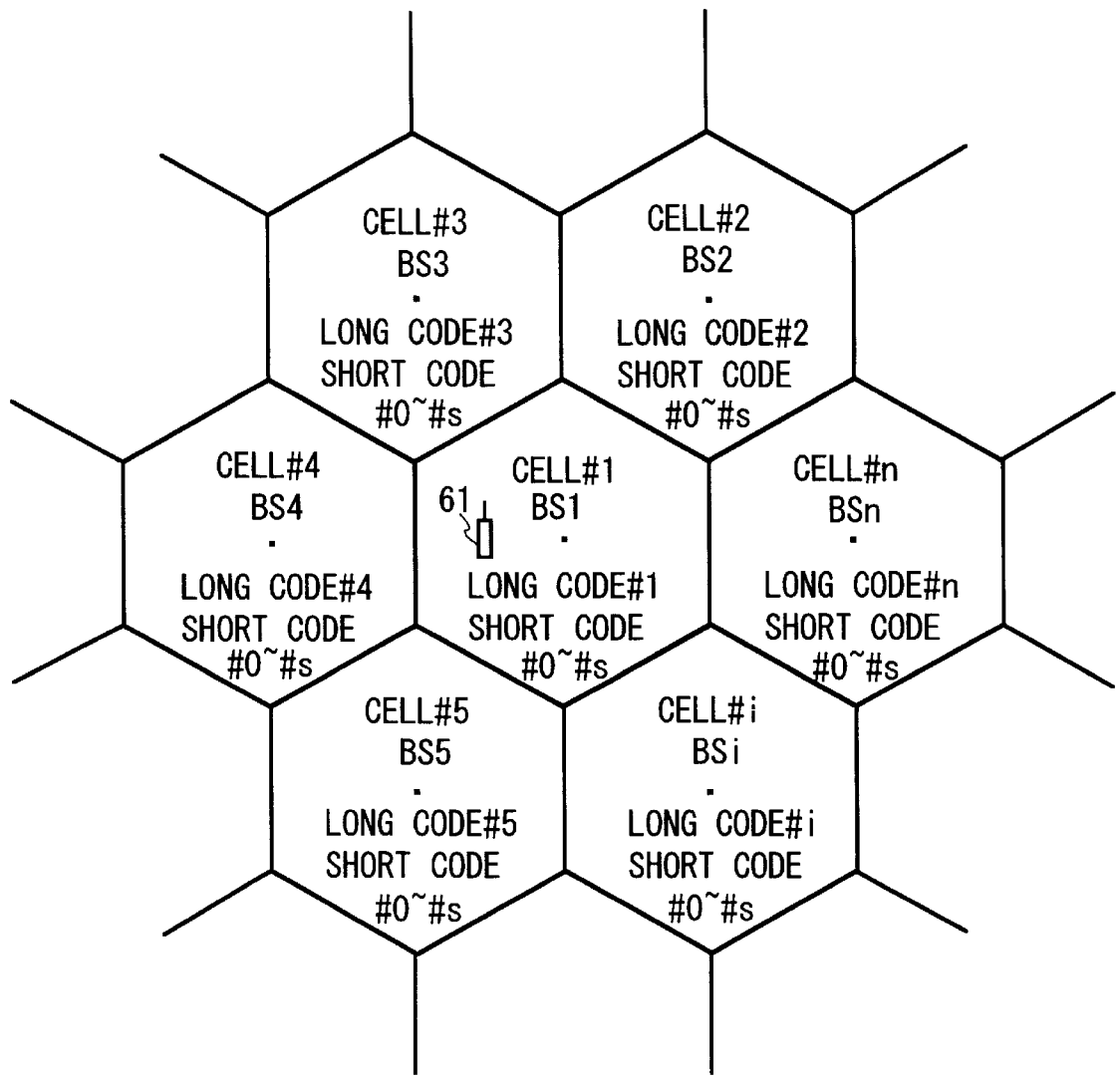
FIG. 1 shows a conventional structure of the cells of DS-CDMA communication system.
Figure 2:
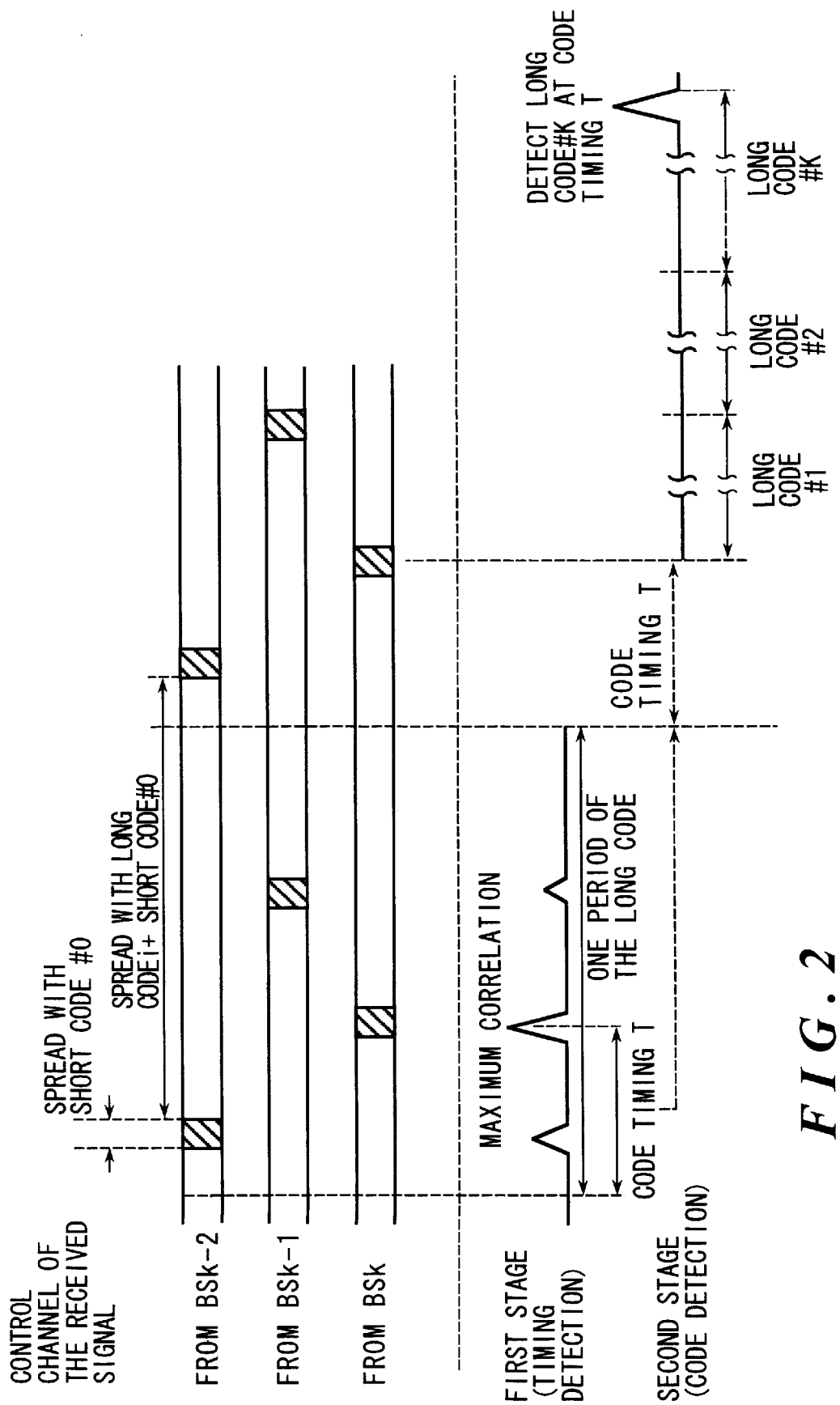
FIG. 2 is a timing chart of the conventional two-step high speed initial synchronization method.
Figure 3:
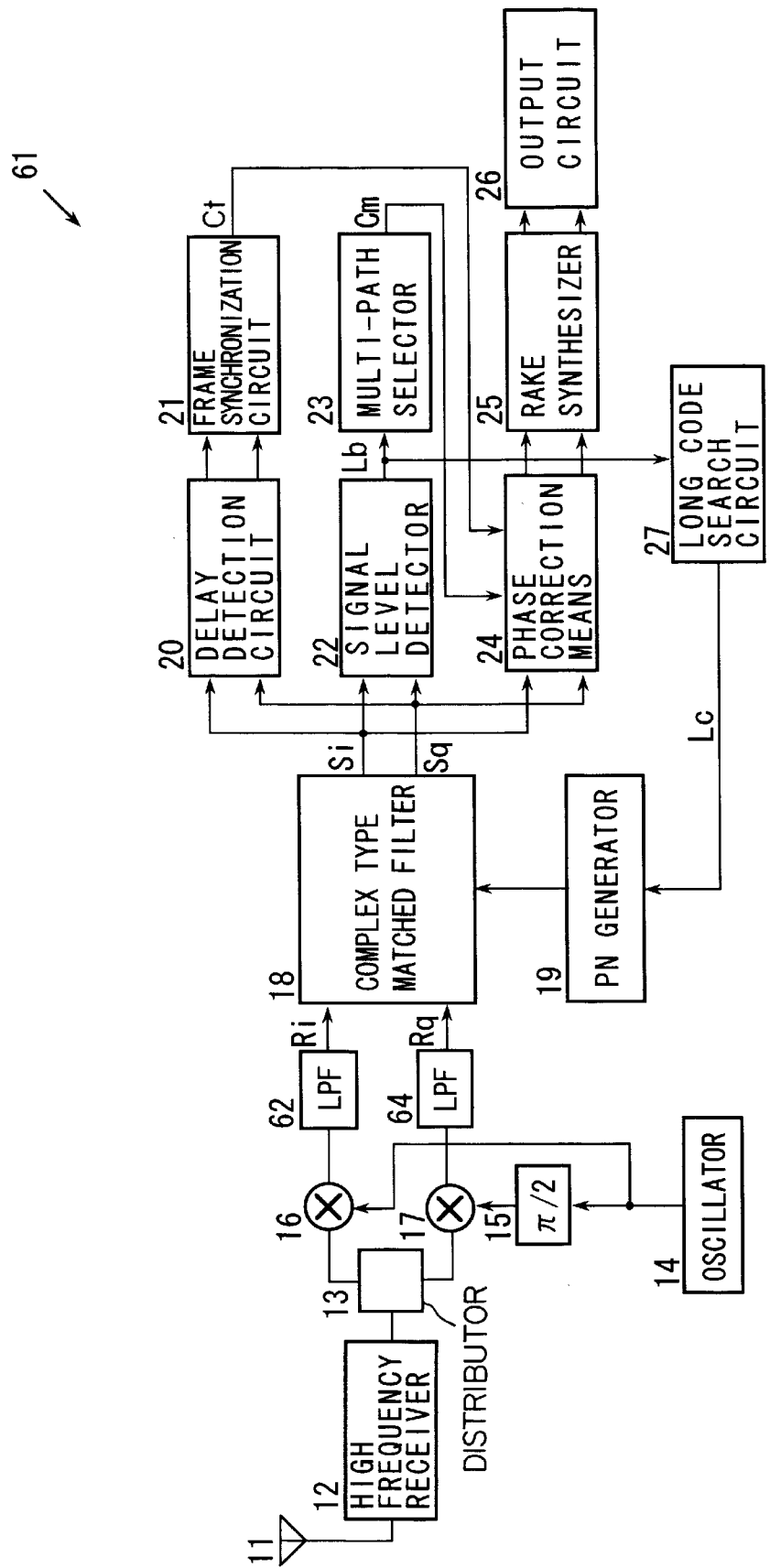
FIG. 3 is a block diagram of the signal reception circuit of the mobile station 61 shown in FIG. 1.

FIG. 3 is a block diagram of the signal reception circuit of the mobile station 61 shown in FIG. 1. In this drawing, a spectrum spread signal received by a reception antenna 11 is demodulated from the BPSK and transformed into an intermediate frequency signal by a high frequency receiver 12, split into two signals by a distributor 13, and supplied to multipliers 16 and 17. An oscillator 14 generates a signal (cos ωt) having an intermediate frequency. The output from the oscillator 14 is directly supplied to the multiplier 16. The output from the oscillator 14 is also input to the multiplier 17 via a phase shift circuit 15 which shifts the phase of the output signal supplied from the oscillator 14 by $\pi/2$.

The multiplier 16 multiplies the intermediate frequency signal received from the distributor 13 by the oscillation output received from the oscillator 14 and outputs a base band signal Ri which is an in-phase component (I component) and is output via a low-pass filter 62. The multiplier 17 multiplies the intermediate frequency signal received from the distributor 13 by the output (sinωt) of the phase shift circuit 15, and outputs a base band signal Rq which is a quadrature component (Q component). In this way, the received signal is quadrature-detected.

The base band signals Ri and Rq are input to a complex-type matched filter 18, multiplied by a PN code sequence generated by a PN code sequence generator 19, and are de-spread. The in-phase component Si of the de-spread output and the quadrature component Sq of the de-spread output received from the complex-type matched filter 18 are input to a delay detection circuit 20, a signal level detector 22, and a phase correction means 24. The delay detection circuit 20 detects the delay of the de-spread output Si and Sq and outputs the detected delay to a frame synchronization circuit 21 which detects the timing of each frame. The resultant output timing signal Ct is input to a phase correction means 24.

The signal level detector 22 calculates the electric power (correlation value) from the de-spread output Si which is the I component and the de-spread output Sq which is the Q component. The resultant output Lb from the signal level detector 22 is supplied to a multi-path selector 23 and a long code search circuit 27. The long code search circuit 27 searches the long code and supplies the number Lc of the long code to the PN generator 19.

The multi-path selector 23 selects multiple peaks having high received signal levels from among the peaks of the signals received through multiple paths. The output Cm of the multi-path selection circuit 23 is input to the phase correction means 24. The phase correction means 24 corrects the phase of the signal received through each path. The Rake synthesizer 25 synthesizes, at a synchronized timing, the phase-corrected output of each path received from the phase correction means 24, and outputs the synthesized output to the output circuit 26. The output of the output circuit 26 is supplied to a subsequent decision circuit or the like not shown in the drawing, which de-modulates and processes the signal.

Figure 4:
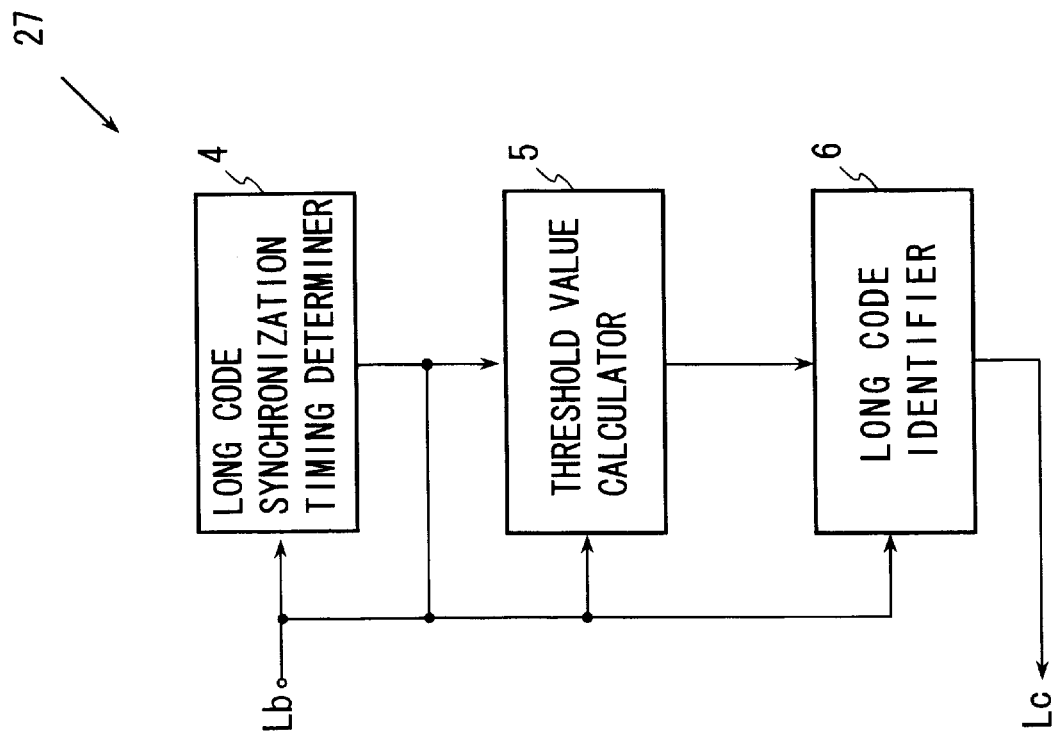
FIG. 4 is a block diagram of the long code search circuit shown in FIG. 3.

FIG. 4 is a block diagram of the long code search circuit 27 shown in FIG. 3. The electric power Lb output from the signal level detector 22 is supplied to the long code synchronization timing determiner 4, the threshold value calculator 5, and the long code identifier 6.

The PN generator 19 is controlled by the long code synchronization timing determiner 4 and the long code identifier 6. At the time of the initial search, the PN generator 19 outputs the short code #0 that is common to the control channels of all base stations. After the long code synchronization timing has been determined, each segment having N chips, which is a portion of the spread code sequence synthesized from the short code #0 and one of the long codes #i unique to each base station, is sequentially loaded and output.

In the neighborhood search before the hand-over, as in the initial cell search, the short code #0 common to the control channels of all base stations is output. After the long code synchronization timing of the base station to be handed over to is determined, the long code search circuit 27 sequentially replaces and outputs each segment having N chips, which forms a portion of a code synthesized from the short code #0 and one of the long codes #i. In particular, the segment taken from a next synthesized code is extracted starting from a position in the next synthesized code which is shifted by a predetermined amount from where the segment of the first synthesized code was extracted. The amount of shifting, however, is smaller than the length of the segments. The long code search circuit 27 searches the long code of the new base station based on the information of the long codes of the neighboring cells received from the control channel of the base station to which the mobile station currently belongs.

The long code synchronization timing determiner 4, in the initial cell search, (1) supplies the short code #0 from the PN generator 19 into the complex-type matched filter 18;

(2) determines the timing at which the average electric power (the electric power averaged over the corresponding timings in plural(R) long code periods) of the maximum correlation value is output;

(3) identifies this timing as the long code identification timing; and (4) outputs the timing to the PN generator 19 and the threshold value calculator 5.

The threshold value calculator 5 calculates a threshold value to be output to the long code identifier 6 based on the electric power of the maximum correlation value of the long code identification timing.

In the neighboring cell search before the hand-over, (1) the short code #0 from the PN code generator 19 is similarly supplied to the complex-type matched filter 18;

(2) the timing at which the average electric power of the maximum correlation value, excluding the correlation value of a currently connected base station, is determined;

(3) this timing is output to the PN code generator 19 as the long code identification timing for the new base station to be handed over to; and (4) the PN code generator 19 supplies the first segment to the complex-type matched filter 18.

The long code identifier 6 sequentially supplies and replaces each of the segments after the long code identification timing is detected, and compares the output Lb of the signal level detector 22 with the prescribed threshold value. If the output Lb of the signal level detector 22 exceeds this threshold value, the synthesized code supplied to the matched filter is identified as the synthesized code of the new base station. The long code of the identified synthesized code, which has been supplied to the PN code generator 19, is identified as the long code of the new base station.

Figure 5:
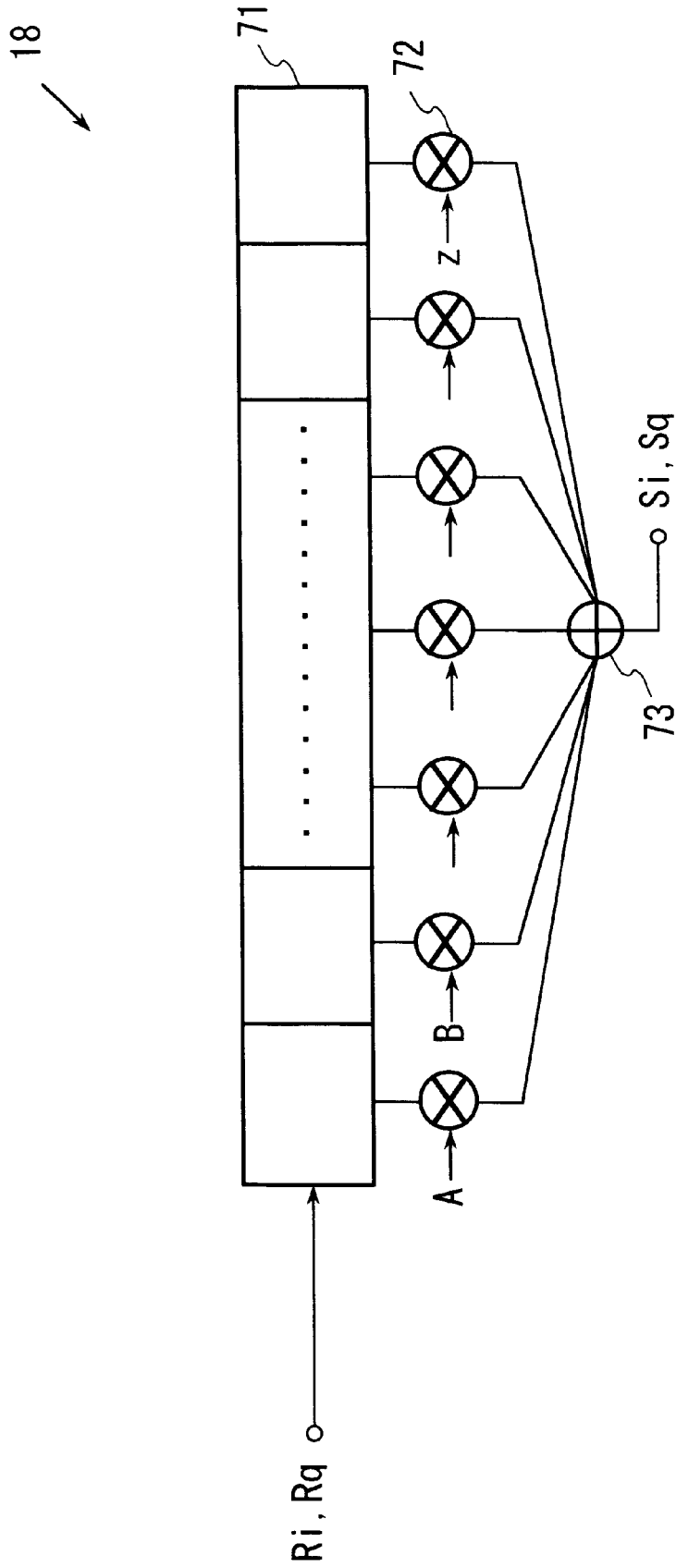
FIG. 5 is a block diagram of the matched filter 18.

FIG. 5 is a schematic drawing of the matched filter 18. In this drawing, it is assumed that the base band received signal is input with positive and negative polarities and that the segments of each synthesized code consists of a binary code sequence, which has values 1 and/or −1.

As shown in FIG. 5, the complex-type matched filter 18 has a shift register 71 consisting of steps, the number of which equals a chip number associated with the amount of shifting between successive synthesized codes, a multiplier 72 for multiplying the tap output of each of the register steps and the coefficient inputs, and an adder 73 for adding all the outputs of the multiplier 72. A portion of the shift register 71 consists of, in practice, analog devices such as a CCD (Charge Coupled Device) and a SAW (Surface Acoustic Wave) filter, or digital devices such as digital IC circuits. As an alternative, a little electric matched filter having analog operation circuits can be used to save the power consumption.

In any of these cases, the complex-type matched filter 18 is operated only for the duration of time in which the peaks of the correlation value can be detected at prescribed time intervals. Even if a matched filter consumes a lot of electric power in the operation for the synchronization, the matched filter operates only at intervals and so the electric power consumption, as a whole, can be kept low.

FIG. 6 shows segments of the synthesized codes to be input to the coefficient input terminals of the matched filter 18. The symbols A, B, . . . , Z written above the code sequences indicate that respective codes are input to the coefficient input terminals A, B–Z, respectively, of FIG. 5. The symbol M represents a natural number.

Figure 7:
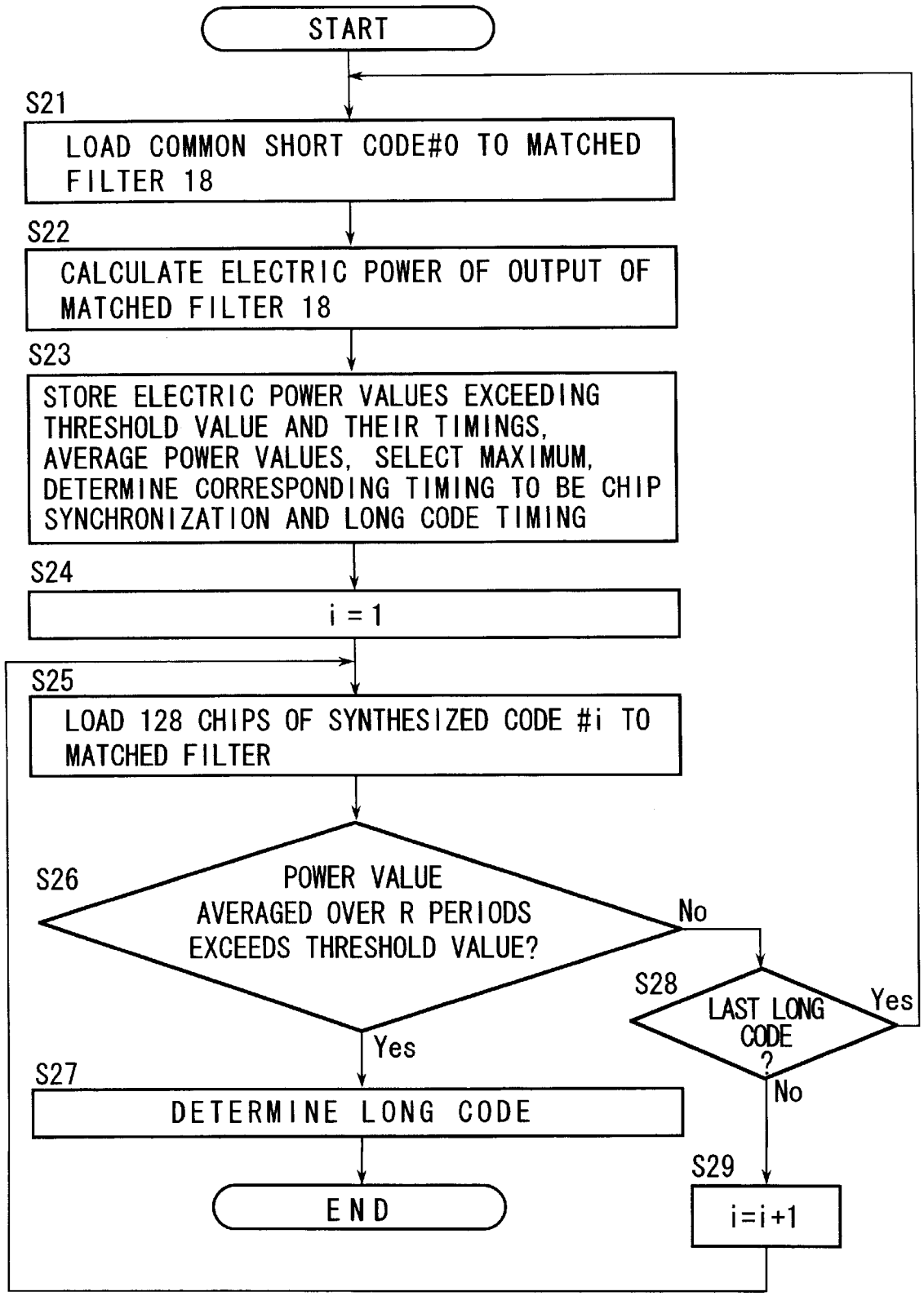
FIG. 7 is a flowchart of the initial cell search of the embodiment shown in FIG. 4.

FIG. 7 is a flow chart for explaining the initial cell search operation. In S21, the PN generator 19 loads the short code #0 to the complex-type matched filter 18. In S22, a correlation between the base band received signal and the short code #0 is obtained by the complex-type matched filter 18. The signal level detector 22 detects the electric power of the output of the complex-type matched filter 18, and outputs the result to the long code synchronization timing determiner 4.

In S23, the long code synchronization timing determiner 4 stores the values of this electric power, and their time within the period of the long code, when the electric power exceeds a certain threshold value. As an alternative, the threshold value can be adaptive-controlled corresponding to the base band received signal by determining the average level of the electric power that has been output from the signal level detector 22.

The above-mentioned process is performed over multiple periods of the long code and the values and their time are stored for multiple times. The stored values of the corresponding time are averaged and are compared with those of the different time. The timing at which the electric power corresponding to the maximum correlation value is achieved is selected after the averaging operation has been completed. The selected timing is output to the PN generator 19 as the long code synchronization timing.

In S24, the long code synchronization timing determiner 4 initially sets the value of i to 1. In S25, the PN generator 19 loads a segment having a prescribed chip length, for example, 128 chips, which forms a portion of a code synthesized from the long code #1 and the short code #0. As shown in FIG. 6, $PN(1)_{128}$, $PN(1)_{127}$, . . . , $PN(1)_1$ are initially input to the coefficient input terminals A–Z.

In S26, the complex-type matched filter 18 finds a correlation between the base band received signal and the segment of the synthesized code #1, namely, a partial correlation with the synthesized code #1. The long code identifier 6 determines whether the electric power of the correlation output has exceeded the threshold value or not. Specifically, a correlation between the base band received signal and the segment of the synthesized code #1 is obtained. If the output of the signal level detector 22 is greater than the prescribed threshold value calculated by the threshold value calculator 5, then the process is advanced to S27. If the output of the signal level detector 22 is not greater than the prescribed threshold value calculated by the threshold value calculator 5, the process is advanced to S28.

The threshold value calculator 5 can adaptively control the threshold value corresponding to the base band received signal by outputting an electric power level which represents a prescribed percentage of the electric power corresponding to the maximum correlation peak value at the time of the long code synchronization timing or the average level of the output electric power of the signal level detector 22 up to the present time.

In S27, the long code #i obtained at this stage is determined to be the long code for the desired base station, and the cell search is finished. In S28, it is determined whether the long code #i is the last long code or not. If the long code #i is the last long code, then the process is returned to S21, and the process is repeated beginning from the determination of the long code synchronization timing. If the long code #i is not the last long code, the process is advanced to S29. The last long code used in this DS-CDMA inter base station asynchronous cellular system is labeled as, for example, long code #512.

In S29, the value of the synthesized code #i is incremented by one. For example, if i=1, it is set to i=2, and the process is returned to S25. In S25, the PN generator 19 loads a segment of the synthesized code #2 synthesized from the long code #2 and the short code #0 to the complex-type matched filter 18.

It suffices to regard this segment of the synthesized code #2 as a sequence $PN(2)_{128}, PN(2)_{127}, \ldots, PN(2)_1$, as in the case of the synthesized code #1, and obtain a correlation with the base band received signal. However, in order to determine the correlation peak of the electric power, a certain amount of processing time, changes in the peak phase and the like must be taken into consideration. Therefore, the base band received signal is correlated with the segment of the next synthesized code #2, after the correlation between the base band received signal and the segment of the synthesized code #1 is obtain, and when the M chips of the base band received signal have been input. While the above procedure is being performed, the M chips of the base band received signal are newly being input to the shift register 71 shown in FIG. 5 and are being shifted.

Therefore, the segment of the next synthesized code #2 with which the correlation is obtained needs to be put in correspondence with the shift of the base band received signal. Hence, as shown in FIG. 6, the segment is input to the coefficient input terminals A–Z shown in FIG. 5 as a sequence $PN(2)_{M+128}, PN(2)_{M+127}, \ldots, PN(2)_{M+1}$.

In the following steps S26–S29, the same process performed for the segment of the synthesized code #1 is repeated for the segment of the synthesized code #2. Theoretically, the value of M can be set to M=1. However, when the accuracy of the chip synchronization, variations of the correlation peak and the like are taken into consideration, setting M=4, by which the margin of such errors can be accommodated, is appropriate. The value of M may be set low in comparison with the chip number of the short code.

A similar process will be explained in the following. When a partial correlation is obtained in S25 by loading the segment of the synthesized code #512 corresponding to the last long code #512, this segment is represented by the sequence $PN(512)_{511M+128}, PN(512)_{511M+127}, \ldots, PN(512)_{511M+1}$ as shown in FIG. 6. These segments of the synthesized code #i can be generated every time. However, they can also be pre-synthesized, stored in a memory inside the long code identifier 6, taken out and read as necessity arises.

Figure 8:
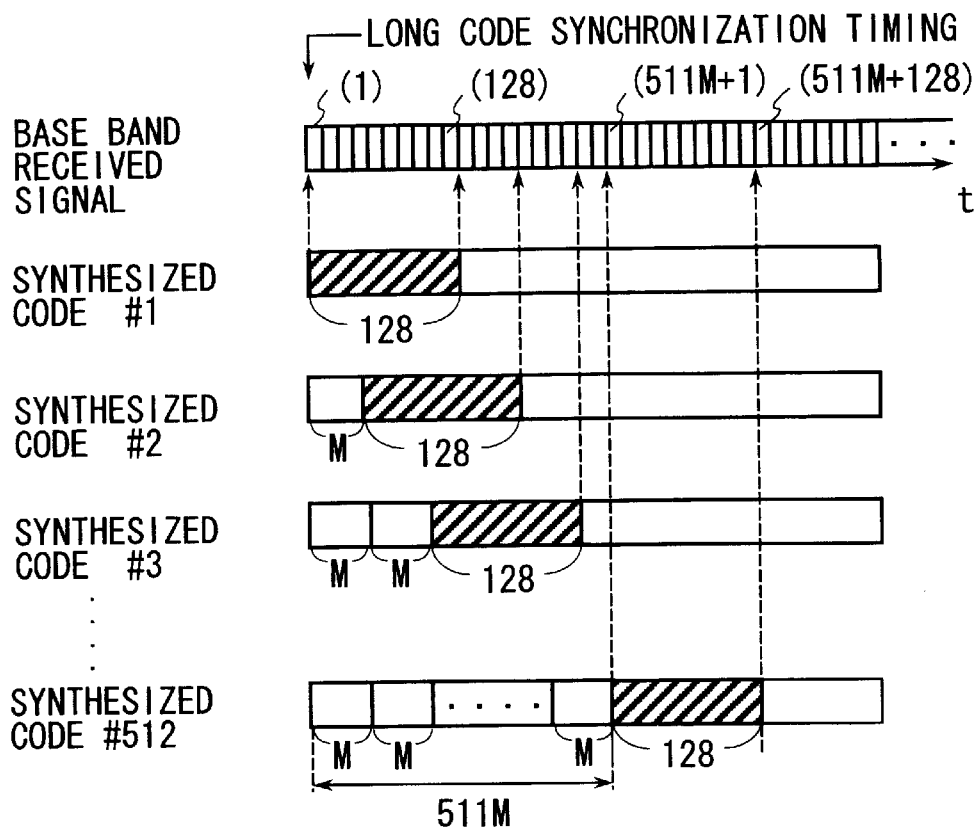
FIG. 8 shows the relation between the base band received signal and the segments of the synthesized codes to be correlation-processed according to the embodiment of the present invention.

FIG. 8 shows the correspondence between the base band received signal and the segment of each synthesized code to be correlation-processed with the base band received signal. In the complex-type matched filter 18, the base band received signal is correlated with a segment consisting of the first through 128-th chips of the synthesized code #1 at the long code synchronization timing. Here, the oldest chip of the base band received signal is determined to be the first chip. With reference to this first chip, the positions of the chips of the base band received signal are shown. In the drawing, the positions of the chips of the base band received signal are indicated in parentheses.

M chips of the base band received signal are newly input and shifted M times. This time, the M+1 th through M+128th chips of the base band received signal are correlated with the segment consisting of the M+1 th through M+128th chips of the synthesized code #2. Next, M further chips of the base band received signal are input and shifted M times. This time, the 2M+1 th through 2M+128th chips of the base band received signal are correlated with the segment consisting of the 2M+1 th through 2M+128th chips of the synthesized code #3.

The complex type matched filter 18 continues to perform a similar correlation process. When the segment of the last synthesized code #512 is correlated with the base band received signal, the 511M+1 th through 511M+128th chips of the base band received signal are correlated with the segment consisting of the 512M+1 th through 511M+128th chips of the synthesized code #512.

As explained in the above, the segment of each synthesized code #i is obtained by shifting the cut out interval by the prescribed M chips corresponding to the new input of the base band received signal to be correlated with. The detection of the correlation between each of the segments and the base band received signal is initiated by the long code identification timing. Each of the segments is sequentially replaced whenever M chips of the base band received signal are newly input to the complex-type matched filter 18 and a new correlation detection is performed.

The initial cell search can be performed at a high speed by the above process. For example, if the chip number N of the segment is 128 (one symbol), the value of M is 4, the total number of the long codes is 512, and all the long codes can be searched once within at most the time corresponding to 128+(512−1)×4=2172 chips.

Figure 9:
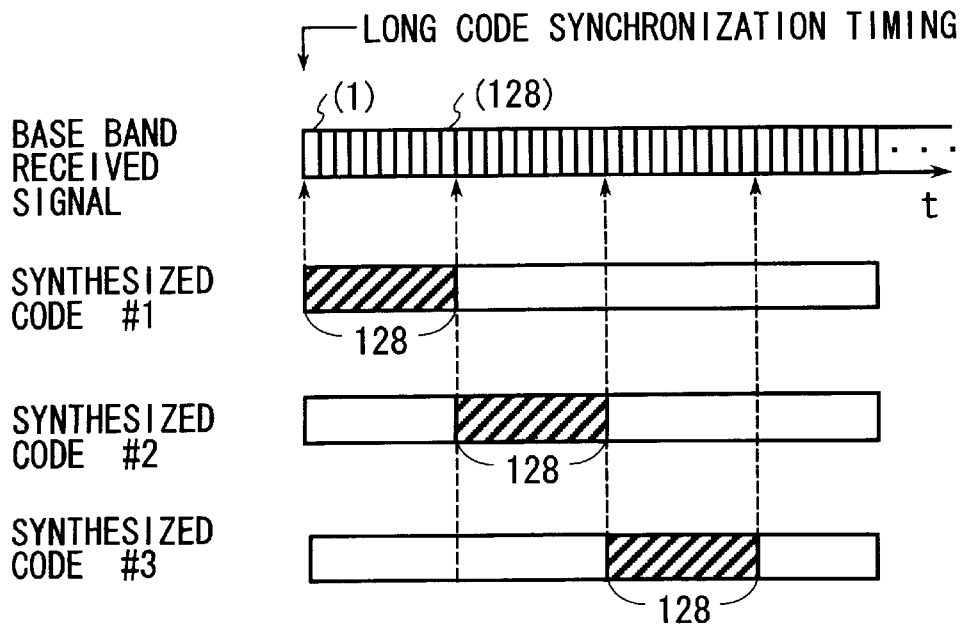
FIG. 9 shows the relation between the base band received signal and the segments of the codes according to the prior art.

FIG. 9 shows the relationships between the base band received signal and the synthesized signal to be correlation-processed with the base band received signal. This figure illustrates the conventional art, which uses the same correlator as that explained in the prior art reference cited in the "Description of Related Art". The segment for identifying the long code has symbols of 128 chips, the same as the present embodiment.

At the time specified by the long code synchronization timing, the first through 128th chips of the base band received signal are correlated with the first through 128th chips of the segment of the synthesized code #1. Then, the 128+1 th through 128×2 th chips of the base band received signal are correlated with the 128+1 th through 128×2 th chips of the segment of the synthesized code #2. Next, the 128×2+1 th through 128×3 th chips of the base band received signal are correlated with the 128×2+1 th through 128×3 th chips of the segment of the synthesized code #3.

When a correlator of the prior art is used, at the time at which the correlation between the base band received signal and one of the synthesized codes has just been processed, the base band received signal no longer remains. On the other hand, according to the embodiment of the present invention, a portion of the base band received signal still remains inside the matched filter at the time at which the correlation between the base band received signal and one of the synthesized codes has been processed. Therefore, the remaining portion of the base band received signal can be used for the correlation processing with the segment of the next synthesized code. Consequently, according to the embodiment of the present invention in which a matched filter is used, the search speed is improved by N/M times. In the case where N=128 and M=4, the search speed is improved by 128/4=32 times. When searching the neighboring cells before the hand-over, the long codes exceeding the threshold value can be searched in the same way as the initial cell is searched, that is, by sequentially inputting the segment of a code, which is synthesized from the long code to be searched and the short code #0, to the matched filter. The long code is input based on the information on the long codes of the neighboring cells supplied from the control channel after the long code synchronization timing has been determined. The search speed is similarly improved by N/M=128/4=32 times in comparison with the conventional art.

In the above explanation, only one matched filter is used. However, the search speed can be further improved by using multiple matched filters, for example two, and by simultaneously performing the correlation detection of different long codes in parallel.

According to this embodiment of the present invention, the base band received signal is corrected with the segment of only one synthesized code at a time. However, if the detected long code synchronization timing is displaced from the true long code synchronization timing due to the multipaths or the like, the segment of the synthesized code would be correlated with the base band received signal at a time displaced from the true long code synchronization timing. In such a case, it may be impossible to identify the long codes.

Therefore, the base band received signal is correlated with the same synthesized code multiple times by displacing the relative timing within several chips at a time. The time at which the maximum correlation electric power has been obtained from among the electric power values obtained from these multiple correlation processing operations is selected as the true long code synchronization timing. Moreover, the desired long codes can be identified from the code numbers of the synthesized codes used in these multiple correlation processing operations.

A concrete explanation will be given with reference to FIG. 7 again. In S26, after the base band received signal and the segment of one of the synthesized codes are correlated at the long code synchronization timing, even while the base band received signal is being input to the complex-type matched filter 18, (1) the output of the signal level detector 22 is continuously stored whenever the base band received signal is input by one chip;

(2) the multiple stored electric power values are compared with each other;

(3) the maximum electric power value is selected out of the multiple stored electric power values; and (4) the code number corresponding to this maximum electric power value is preserved.

The preserved maximum electric power value is compared with the predetermined threshold value calculated by the threshold value calculator 5. If the preserved maximum electric power value exceeds this threshold value, the process is advanced to S27. Otherwise, the process is advanced to S28.

When the process is returned to S26 via S28, S29 and S25, the correlation between the base band received signal and the segment of the next synthesized code is detected. However, as mentioned in the above, this step is performed after the M chips of the base band received signal have been newly input to the complex-type matched filter 18. Hence, the number of electric power values of the output of the signal level detector 22 to be stored continuously can be arbitrarily set as long as it is less than or equal to M. Conversely, the value of M can be determined corresponding to the chip number to be stored continuously.

Figure 10:
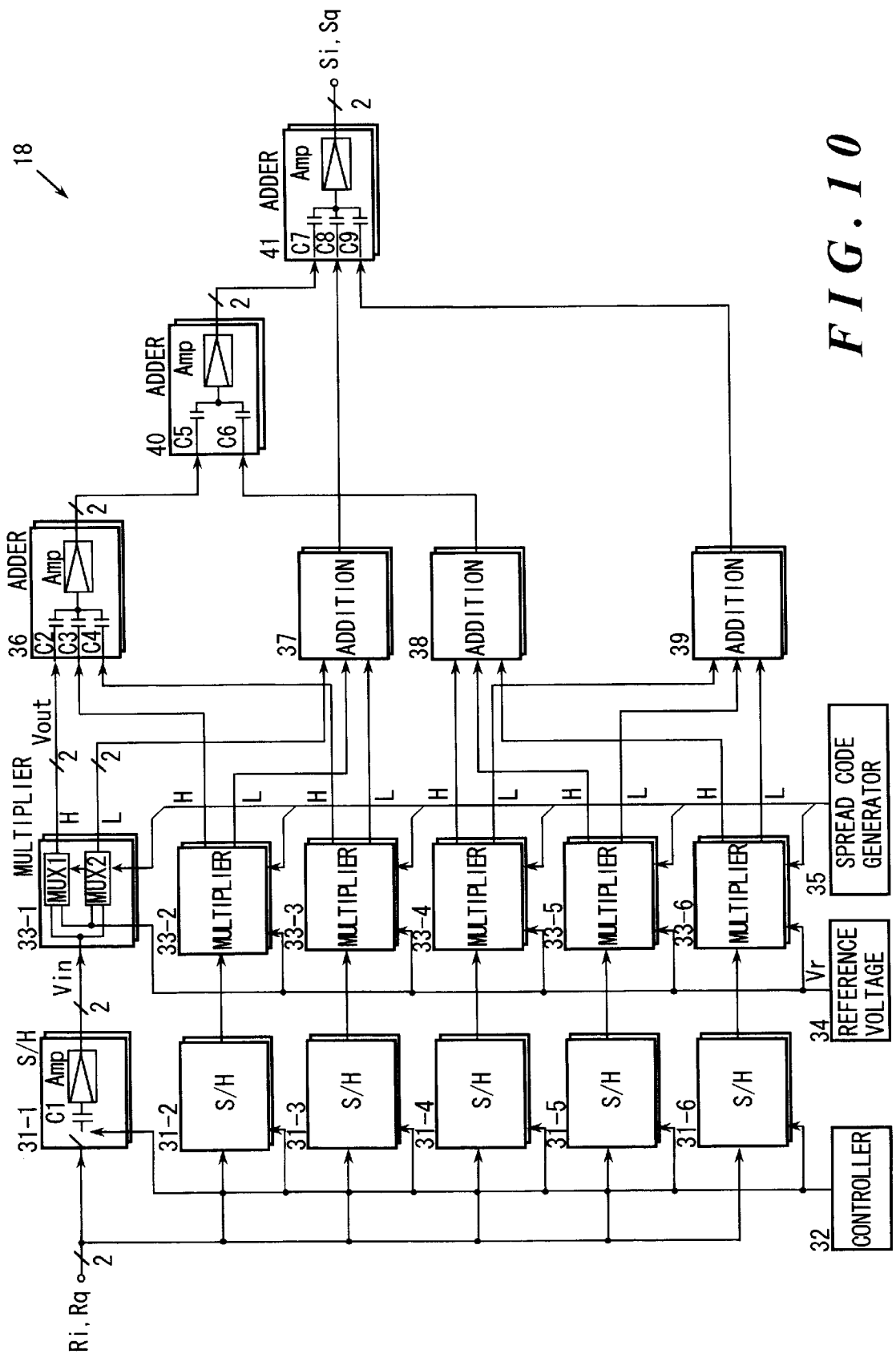
FIG. 10 is a block diagram of an example of the matched filter in FIG. 1.

FIG. 10 illustrates an example of the complex-type matched filter 18 shown in FIG. 4. Since the electric power consumption of the matched filter is small, the electric power consumption of the mobile station to which the present invention is applied can be further reduced.

In order to simplify the drawings, the spread code sequences illustrated therein consist of 6 bits and have six delay stages. However, since far longer code sequences are used for the actual spread code sequences in practice, the number of stages actually installed in the matched filter 18 corresponds to the actual spread code sequences.

Each of the base band received signals Ri and Rq is distributed and sequentially input to one of the sample holders 31-1–31-6 by the controller 32 which controls the sampling timing. Each of the outputs of the sample holders 31-1–31-6 is multiplied in the multipliers 33-1–33-6 by the output of the spread code generator 35, which generates spread code sequences, and added is then in the adders, 36–41, and the correlation values Vr are output. The reference voltage is input to the multipliers 33-1–33-6 from the reference voltage generator 34.

Each of the sample holders 31-1–31-6 have an analog switch controlled by the controller 32, a capacitor C1, and an inversion amplifier Amp. Each of the adders 36–41 has capacitors connected to multiple input terminals and an inversion amplifier Amp. In this matched filter 18, the capacitors are connected between the input sides and the analog operation circuits (neuro-operation amplifier) in the sample holders 31-1–31-6 and the adders 36–41.

Figure 11:
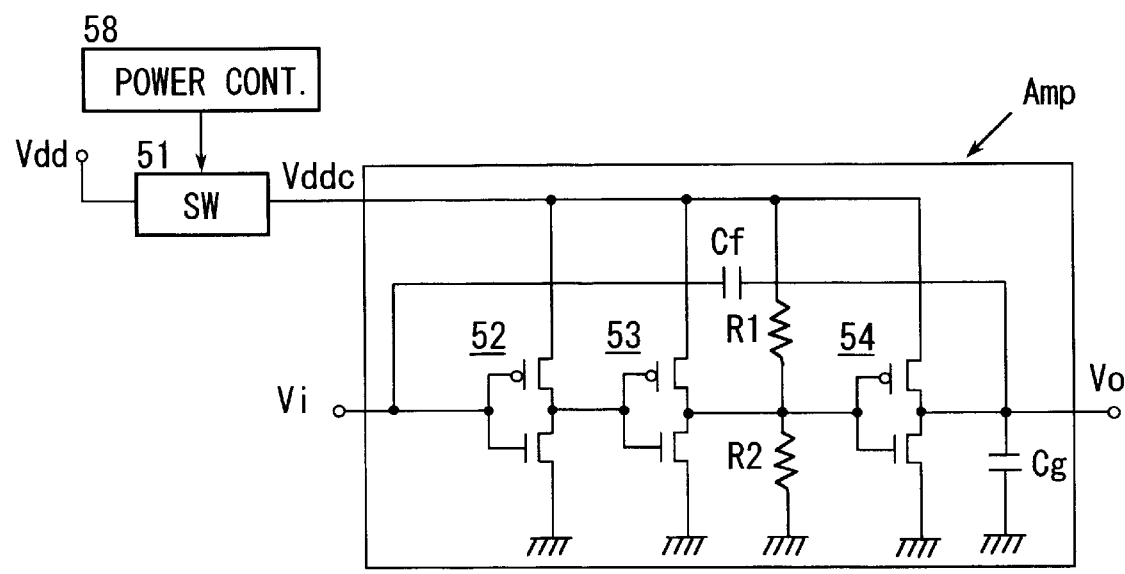
FIG. 11 illustrates the inversion amplifier Amp.

FIG. 11 is the inversion amplifier Amp shown in FIG. 10 (a).

The switch 51 is serially connected between the power source Vdd and the inversion amplifier Amp. A power controller 58 controls the switch 51 so as to activate the inversion amplifier Amp only when necessary. The CMOS inverters 52–54 are cascade-connected. The input terminal Vi is the input of the CMOS inverter 52, and the output terminal Vo is the output of the CMOS inverter 54. Installed between the two terminals is the capacitance Cf for feedback.

The inversion amplifier Amp uses the inverters as amplifiers through which the outputs of the CMOS inverters shift from a high level to a low level or from a low level to a high level. The inversion amplifier Amp has an odd number stages of CMOS inverters, for example, three stages of CMOS inverters as shown in the drawing. The resistors R1 and R2 divide the electric power source voltage between the stages of the CMOS inverters 53 and so control the gain of the amplifier Amp. The capacitor Cg is installed between the output terminal Vo and the earth for phase adjustment. The resistors R1 and R2 and the capacitor Cg prevent oscillation of the inversion amplifier Amp.

FIG. 14 shows the analog operation circuit that supplies the input voltages via capacitors. The input voltages V1 and V2 are supplied to the inversion amplifier Amp via capacitors C1 and C2, respectively. Since the voltage amplification factor of the inversion amplifier Amp is very large, the voltage value Vb at point B, the input side of this inversion amplifier, is kept almost constant. Point B is connected to the gate of a transistor, which constitutes the CMOS inverter 52, and to the capacitors C1, C2 and Cf. Point B is in a floating state with respect to any electric power sources.

Therefore, if the electric charge stored in each of the capacitors C1, C2 and Cf is zero in the initial state, the total amount of electric charge stored in these capacitors remains zero, even when the input voltages V1 and V2 are supplied. This observation can be expressed in terms of the formula of electric charge conservation:

$$C1(V1-Vb)+C2(V2-Vb)+Cf(Vout-Vb)=0 \quad (1)$$

Here, the symbols C1, C2, and Cf represent the capacitance of the capacitors C1, C2, and Cf. Each of the input voltages V1 and V2 is replaced by the voltage measured with respect to the reference voltage Vb at point B as follows.

$$V(1)=V1-Vb, \ V(2)=V2-Vb, \ V'out=Vout-Vb \quad (2)$$

Then the following equation can be derived.

$$V'out=-\{(C1/Cf)V(1)+(C2/Cf)V(2)\} \quad (3)$$

In other words, the output voltage Vo is obtained by inverting the polarity of the sum of the input voltages V(i) measured with respect to Vb multiplied by the coefficient (Ci/Cf) which represents the ratio of the input capacitance Ci with respect to the feedback capacitance Cf. The output voltage V' is output from the analog operation circuit (neuro-operation amplifier).

The sample holders 31-1–31-6 are the particular type of the analog operation circuits (neuro-operation amplifiers) shown in FIG. 14, which has only one input terminal. If the values of the input capacitance C1 and the feedback capacitance Cf are equal, the output voltage becomes −V(1) in accordance with the equation (3). In other words, the voltage of the base band received signal is inverted and output when the controller 32 opens the input switch.

The controller 32 controls the sample holders 31-1–31-6 by sequentially supplying control signals to the sample holders 31-1–31-6. Each of the control signals close and sequentially opens the analog switch installed in each of the sample holders 31-1–31-6, at the timing of each of the chips of the spread modulation signal, to take in the input voltage. In this way, the received signal corresponding to one period of the spread code sequence is taken in by each of the sample holders 31-1–31-6, the polarity of the received signal is inverted, and the received signal is output. The outputs of the sample holders 31-1–31-6 are input to the multipliers 33-1–33-6, respectively. Each of the multipliers 33-1–33-6 has two identically structured multiplexers MUX1 and MUX2.

Figure 12:
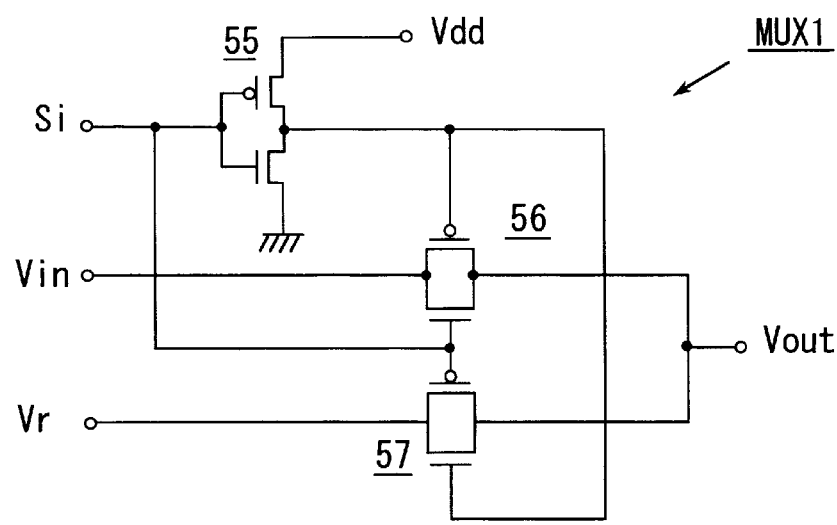
FIG. 12 illustrates the multiplier MUX.

FIG. 12 shows the multiplexer MUX1 shown in FIG. 10. When the control signal Si supplied from the spread code generator 35 is "1" (high level), the transmission gate 56 becomes conductive and the transmission gate 57 becomes non-conductive. In this case, the input signal Vin supplied from the sample holding circuit 31-1 is output as an output signal Vout. When the control signal Si is "0" (low level), the transmission gate 57 becomes conductive and the transmission gate 56 becomes non-conductive. In this case, the input signal Vr supplied from the reference voltage generator 34 is output as an output signal Vout.

The input connections of the transmission gates 56 and 57 of the second multiplexer circuit MUX2 are opposite those that of the first multiplexer circuit MUX1. In other words, the reference voltage Vr is supplied to the transmission gate 56, and the output voltage Vin of the sample holding circuit 31-i is supplied to the transmission gate 57.

From the spread code sequence output from the spread code generator 35, the data corresponding to the bit of the multiplier 33-i is input to the control signal input terminal Si. The output signal Vout of the first multiplexer circuit MUX1 becomes the H-output of the multiplier 33-i, and the output signal Vout of the second multiplexer circuit MUX2 becomes the L-output of the multiplier 33-i.

It follows that the multiplexer MUX1 outputs the input voltage from the sample holding circuit 31-i, and the multiplexer MUX2 outputs the reference voltage Vr from the reference voltage generator 34 when the bit of the spread code supplied as the control signal Si is "1". On the other hand, when the bit corresponding to the spread code is "0", the multiplexer MUX1 outputs the reference voltage Vr, and the multiplexer MUX2 outputs the input voltage from the sample holding circuit 31-i.

FIG. 13 shows the reference voltage generator Vref. The switch 51 is serially connected between the electric power source Vdd and the reference voltage generator Vref. An electric power controller 58 controls the switch 51. The switch 51 activates the reference voltage generator Vref only when needed. The CMOS inverters 82–84 are identical to the cascade-connected CMOS inverters shown 52–54 in FIG. 11. However, their circuit symbols are simplified in FIG. 13. Similar to the inversion amplifier Amp shown in FIG. 11, resistors R3 and R4 for controlling the gain and a capacitor Ch for phase modulation are installed. Ch also denotes the capacitance of the capacitor.

This reference voltage generator Vref stabilizes its output voltage at a level at which its input voltage and output voltage are equal. The reference voltage generator Vref is capable of generating a desired reference voltage Vr by setting the threshold value of each of the CMOS inverters 82–84. Here, $$Vr=Vdd/2=Vb,$$

so that the dynamic range can be expanded. Therefore, when the reference voltage Vr is output from the H-output or the L-output of the multipliers 33-1–33-6, the base band received signal becomes 0 in accordance with the equation (3).

The outputs (H-output) from the MUX1s in multipliers 33-1–33-3 are input to the adder 36. In the adder 36, the magnitude of the input capacitors C2, C3, and C4 corresponding to each of the multipliers 33-1–33-3, respectively, is set to ⅓ of the feedback capacitance Cf.

In accordance with the above-mentioned equation for V'out, a voltage having ⅓ the magnitude of the sum of the output voltages of the multipliers 33-1–33-3 is output. The polarity of this output voltage is identical to that of the voltage of the base band received signal that is the input to this matched filter 18 The H-outputs of the multipliers 33-4–33-6 are input to the adder 38, which outputs a voltage the magnitude of which is the sum of the output voltages of the multipliers 33-4–33-6 as in the above-mentioned case. The polarity of this voltage is also identical to that of the base band received signal.

The outputs of the adders 36 and 38 are input to the adder 40. The values of the input capacitors C5 and C6 pertaining to this adder 40 are both set to ½ the value of the feedback capacitance Cf. The adder 40 outputs a voltage the magnitude of which is the sum of ½ the output of the adder 36 and ½ the output of the adder 38. The polarity of this voltage is opposite to that of the base band received signal.

On the other hand, the output (L-output) of the MUX2 of any of the multipliers 33-1–33-3 is input to the adder 37. The adder 37 outputs a voltage the magnitude of which is the sum of the output voltages of the multipliers 33-1–33-3.

Moreover, the L-outputs of the multipliers 33-4–33-6 are input to the adder 39. The adder 39 outputs a voltage the magnitude of which is the sum of the output voltages of the multipliers 33-4–33-6 as in the above-mentioned case. The polarity of any of these output voltages is identical to that of the base band received signal.

The outputs of the adders 40, 37, and 39 are input to the adder 41. The input capacitance C7 of the adder 41 corresponding to the input from the adder 40 is set equal to the feedback capacitance Cf. Since the capacitance of the input capacitors C8 and C9 corresponding to the adders 37 and 39 is set to ½ the value of Cf, the adder 41 outputs a voltage which is the sum of the output of the adder 40 and ½ the output voltages of the adders 37 and 39. Therefore, the adder 41 supplies a voltage difference between a first and a second sum. The first sum is made from the output of the sample holding circuit 31-i connected to the multiplier 33-i to which the "1" of the spread code sequence is supplied from the spread code generator 35. The second sum is made from the output of the sample holding circuit 31-i connected to the multiplier 33-i to which the "0" of the spread code sequence is supplied. In other words, the correlation value between the base band received signal and the spread code sequence is output from this adder 41.

In order to prevent the maximum voltage from exceeding the electric power source voltage, the adder 40 outputs a voltage that is ½ the sum of the input voltages, and the adder 41 adds to that voltage ½ the voltages from the adders 37 and 39.

Chips that are newly input at the next timing of the base band received signal after the correlation value has been output from the adder 41 are input to one of the sample holders 31-1–31-6 in which the oldest chip of the base band received signal has been sample-held. In synchronization with this, the spread code generator 35 shifts the spread code sequence by one chip and outputs it. The above-mentioned operation is repeated, and the correlation value of the same spread code sequence with the base band received signal at the above-specified next timing is obtained. Since the base band received signal that has once been sample-held to the sample holders 31-1–31-6 does not need to be shifted, errors can be prevented. In this way, this matched filter 18 is capable of performing the correlation operation process by sequentially distributing the base band received signal to the sample holders 31-1–31-6 and shifting of the spread code sequence.

According to this matched filter 18, operations are performed by analog processes based on capacity coupling. Therefore, the circuitry can be greatly reduced in comparison with a digital processes, and the processes can be performed at a high speed since the operations are performed in parallel. Moreover, since the inputs and outputs of each of the circuits are all voltage signals, the electric power consumption can be kept extremely low.

The above explanation shows as an example the case in which the base station transmitter QPSK-modulates and sends out a transmission signal obtained by spread-modulating the transmission data using binary codes, and the receiver of the mobile station de-spreads the received signal using binary codes after QPSK-modulating the received signal in order to compensate for the phase changes due to fading and so forth. As an alternative, the base station may BPSK-modulates the transmission signal and the received signal can be BPSK-demodulated in the receiver. Furthermore, the modulations for the data modulation and the spread coding are not restricted to particular forms. Thus, any combination of different modulation systems can be freely adopted and achieved using fundamentally the same structure. For example, a transmission signal obtained by spread-modulating the transmission data using a complex code sequence can be QAM-modulated and sent out.

According to the present invention, the initial synchronization can be performed at a high speed since the long code is identified in the matched filter 18 based on the long code synchronization timing at the time of the initial cell search. The initial synchronization can be performed at high speed during the neighboring cell search too, since the long code of the base station to be handed over to is identified in the matched filter 18 based on the long code synchronization timing of the new base station BS. Furthermore, it is possible to provide a receiver which consumes little electric power by employing a matched filter having analog operation circuits (neuro-operation amplifier). As opposed to the conventional two-step cell search method in which a matched filter and a correlator are used in combination, only a common matched filter is employed in the present invention. Therefore, the circuitry can be kept small and the system configuration is simplified.

What is claimed is:

1. An initial synchronization method for a DS-CDMA inter base station asynchronous cellular system, which uses a plurality of synthesized spread code sequences, each synthesized spread code sequence being synthesized from a long code corresponding to a cell and one of a plurality of short codes corresponding to communication channels, wherein a specific short code of the plurality of the short codes is assigned to a control channel of the cells, comprising the steps of:

(1) receiving a control signal in the control channel of a base station, a part of the control signal in every long code period being spread only by the specific short code, and other parts of the control signal being spread by one of the synthesized spread code sequence;

(2) correlating the control signal with the specific short code to produce a correlation signal;

(3) determining a long code synchronization timing of the control signal based on the correlation signal;

(4) detecting correlation between the control signal and segments of the synthesized spread code sequences, the synthesized spread code sequences being synthesized from the different long codes and the specific short code, each segment being taken from a portion of a respective one of the synthesized spread code sequences, starting from a first position in a first of the synthesized spread code sequences from where a first segment is taken, and in successive synthesized spread code sequences, starting from a position in each successive synthesized spread code sequence which is shifted by a predetermined shifting amount from where a preceding segment was taken from a preceding one of the synthesized spread code sequences, the predetermined shifting amount being less than a length of each segment, and the control signal and each segment being synchronized by the long code synchronization timing; and (5) identifying which of the different long codes synthesizes said one of the synthesized spread code sequences, which corresponds to the control signal, based on the electric power level of the correlation signal.

2. An initial synchronization method as claimed in claim 1, wherein the detecting step includes a step of sequentially replacing an existing one of the segments with a successive one of the segments a length of the control signal substantially equal to the shifting amount is newly input to a matched filter.

3. A receiver for a DS-CDMA inter base station asynchronous cellular system, which uses plurality of synthesized spread code sequences, each synthesized spread code sequence being synthesized from one of different long codes corresponding to a cell and one of a plurality of short codes corresponding to communication channels, wherein a specific short code common to each of the cells is assigned to a control channel, comprising:

(1) a spread code generating means which outputs segments of the synthesized spread code sequences by synthesizing a different long code and the specific short code, each segment being taken from a portion of a respective one of the synthesized spread code sequences, starting from a first position in a first of the synthesized spread code sequences from where a first segment is taken, and in successive synthesized spread code sequences, starting from a position in each successive synthesized spread code sequence which is shifted by a predetermined shifting amount from where a preceding segment was taken from a preceding one of the synthesized spread code sequences, the predetermined shifting amount being less than a length of each segment;

(2) a matched filter which finds a correlation between the segment being output by the spread code generating means and a received signal;

(3) a long code synchronization timing determination means which determines a long code synchronization timing transmitted from a corresponding base station, based on a correlation between the specific short code and the received signal; and (4) a long code identification means which:
  (a) loads the first segment to the matched filter from the spread code generating means based on the long code synchronization timing;
  (b) sequentially supplies successive ones of the segments every time a length of the received signal substantially equal to the shifting amount is newly input to the matched filter; and
  (c) identifies the long code transmitted from the corresponding base station based on the magnitude of electric power in an output signal of the matched filter.

4. A receiver for a DS-CDMA inter base station asynchronous cellular system as claimed in claim 3 wherein:

(1) the spread code generating means further outputs the specific short code; and (2) the long code synchronization timing determination means:
  (a) loads the specific short code from the spread code generating means to the matched filter; and
  (b) determines the long code synchronization timing that is transmitted from the base station based on the magnitude of electric power in the output signal of the matched filter.

5. A receiver for a DS-CDMA inter base station asynchronous cellular system as claimed in any of claims 3 or 4 wherein the matched filter includes:

(1) a plurality of sample holders;

(2) a plurality of multipliers which output an output of each of the sample holders to one of a first output terminal and a second output terminal in response to an output of the spread code generating means;

(3) a first analog addition circuit which adds an output of the first output terminal of each of the multipliers;

(4) a second analog addition circuit which adds an output of the second output terminal of each of the multipliers; and (5) a third analog addition circuit which subtracts an output of the first analog addition circuit from an output of the second analog addition circuit.

6. A mobile station for a DS-CDMA inter base station asynchronous cellular system which uses a plurality of synthesized spread code sequences, each synthesized spread code sequence being synthesized from (a) a long code corresponding to a cell and (b) one of a plurality of short codes corresponding to communications channels, wherein a specific short code common to each of the cells is assigned to a control channel, the mobile station comprising:

(1) a receiver for receiving a high frequency signal carrying a synthesized spread code sequence and providing an output signal carrying the synthesized spread code sequence at an intermediate frequency;

(2) a demodulator for demodulating the output signal from the receiver and providing a baseband signal corresponding to the synthesized spread code sequence;

(3) a spread code generator for outputting segments of synthesized spread code sequences, each synthesized spread code sequence being synthesized from a different long code corresponding to a respective one of the cells and the specific short code, each segment being taken from a portion of a respective one of the synthesized spread code sequences, starting from a first position in a first of the synthesized spread code sequences from where a first segment is taken, and in successive synthesized spread code sequences, starting from a position in each successive synthesized spread code sequence which is shifted by a predetermined shifting amount from where a preceding segment was taken from a preceding one of the synthesized spread code sequences, the predetermined shifting amount being less than a length of each segment;

(4) a matched filter for finding a correlation between the segments being output by the spread code generator and the baseband signal;

(5) a long code synchronization timing determiner for determining a long code synchronization timing transmitted from a corresponding base station, based on a correlation between the specific short code and the baseband signal; and (6) a long code identificater for:
  (a) loading the first segment to the matched filter from the spread code generator based on the long code synchronization timing;
  (b) sequentially loading and replacing successive ones of the segments every time a length of the baseband signal substantially equal to the shifting amount is newly input to the matched filter; and
  (c) identifying the long code transmitted from the corresponding base station based on the magnitude of electric power in an output signal from the matched filter.

7. A mobile station as claimed in claim 6, wherein:

(1) the spread code generator means further outputs the specific short code; and (2) the long code synchronization timing determiner:
  (a) loads the specific short code from the spread code generator to the matched filter; and (b) determines the long code synchronization timing that is transmitted from the base station based on the magnitude of electric power in the output signal of the matched filter.

8. A mobile station as claimed in claims 6 or 7, wherein the matched filter includes:
   (1) a plurality of sample holders;
   (2) a plurality of multipliers which output an output of each of the sample holders to one of a first output terminal and a second output terminal in response to an output of the spread code generator;
   (3) a first analog addition circuit which adds an output of the first output terminal of each of the multipliers;
   (4) a second analog addition circuit which adds an output of the second output terminal of each of the multipliers; and
   (5) a third analog addition circuit which subtracts an output of the first analog addition circuit from an output of the second analog addition circuit.

9. A mobile station as claimed in claim 6, further comprising a signal level detector connected electrically between the output from the matched filter and the long code identifier, the signal level detector being arranged so as to detect the electric power and provide a power-level-indicative signal to the long code identifier.

10. A mobile station as claimed in claim 9, wherein the demodulator is a quadrature demodulator and the matched filter is a complex-type matched filter.

11. A mobile station as claimed in claim 10, further comprising a phase correction module for correcting phase differences between quadrature outputs from the complex-type matched filter, and providing phase-corrected output signals.

12. A mobile station as claimed in claim 11, further comprising a rake synthesizer connected to the phase-corrected output signals.

13. A mobile station as claimed in claim 12, further comprising a delay detector connected to the quadrature outputs for detecting a delay therein, and a frame synchronizer responsive to the delay detector, for providing the phase correction module with a frame timing signal.

14. A mobile station as claimed in claim 13, further comprising a multi-path selector responsive to the power-level-indicative signal, for selecting higher peaks in the quadrature outputs over lower peaks therein and providing a selection signal to the phase correction module.

15. A mobile station as claimed in claim 9, further comprising a signal level detector connected electrically between the output from the matched filter and the long code identifier, the signal level detector being arranged so as to detect the electric power and provide a power-level-indicative signal to the long code identifier, wherein the long code identifier includes means for informing a long code in a presently synthesized spread code sequence to the spread code generator.

16. A mobile station as claimed in claim 15, wherein the means for informing the spread code generator includes means for transmitting a digital code value to the spread code generator, the digital code value being associated with only one of the synthesized spread code sequences and thereby being indicative of the long code used to synthesize the only one of the synthesized spread code sequences.

* * * * *